Figure 1:
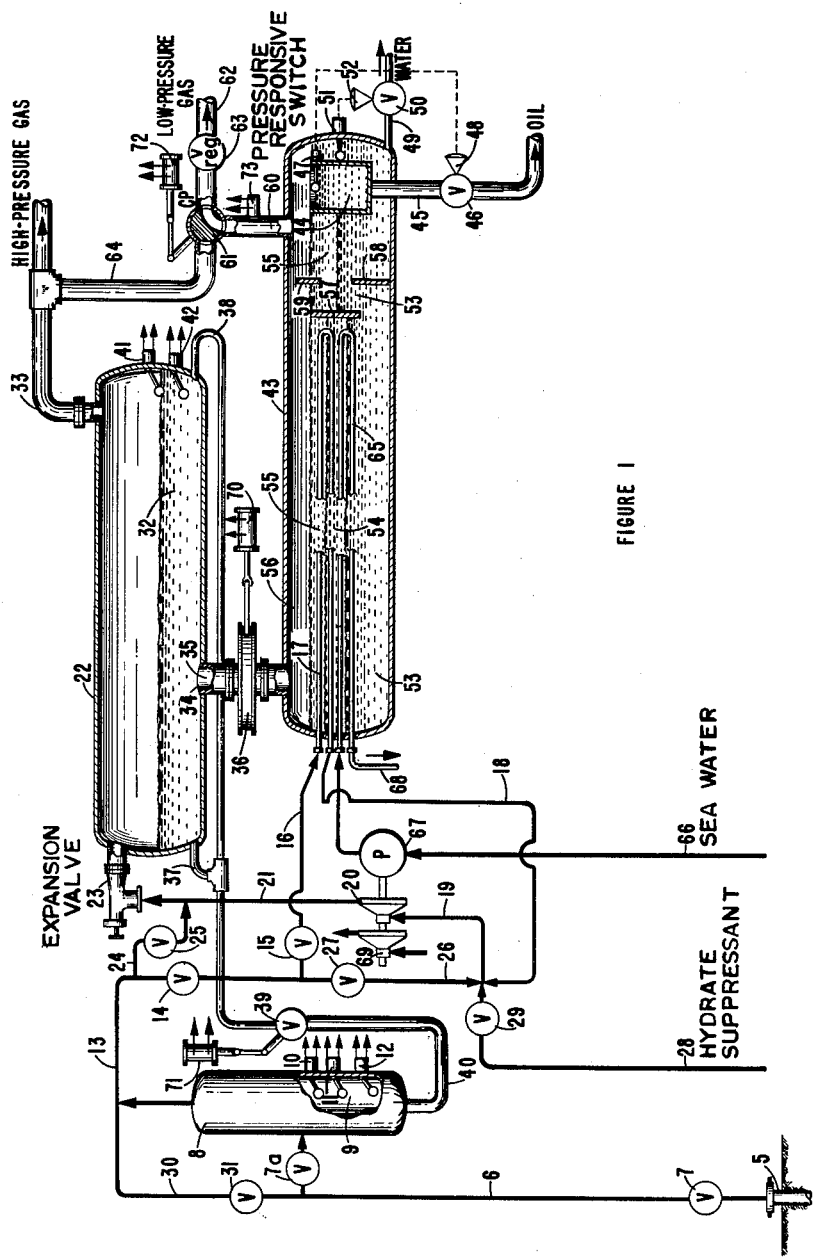

INVENTOR
DOUGLAS C. MEYERS
CLIFFORD L. BARR
BY *Oswald H. Wilmore*
THEIR ATTORNEY

United States Patent Office 3,159,473
Patented Dec. 1, 1964

3,159,473
LOW-TEMPERATURE DEHYDRATION OF
WELL FLUIDS
Douglas C. Meyers and Clifford L. Barr, Metairie, La.,
assignors to Shell Oil Company, New York, N.Y., a corporation of Delaware
Filed Aug. 19, 1960, Ser. No. 50,777
23 Claims. (Cl. 62—12)

The invention relates to improvements in the method and means for low-temperature dehydration of high-pressure well fluids which contain gas.

The invention is, more particularly, concerned with the dehydration of well fluids by cooling the gas through expansion to a temperature at which moisture is precipitated, together with condensible hydrocarbons, if present, and is especially although not exclusively applicable to well fluids having a high gas-to-liquids ratio.

The low-temperature separation of moisture from such well fluid has become accepted practice in the petroleum industry and is necessary to reduce the moisture content and, in some instances, the liquefiable hydrocarbon content to below levels required to render the gas merchantable. To separate such constituents by precipitation involves a depression in the fluid temperature, as by expansion through an orifice or isentropic expansion in an engine with production of shaft work. It is desirable to limit the extent to which the pressure is reduced in order to avoid the need for recompressing the gas to attain the pressure of the gas flow lines such as commercial sales pipe lines or collecting lines.

When moisture is precipitated by such a cooling operation, difficulties are encountered due to the formation of hydrates, which are crystalline compounds or agglomerates of water and certain components of the well fluid; they look like hard snow and are formed as a result of temperature reduction, particularly when high-pressure gas containing water vapor is expanded to a lower pressure. It is known to melt such hydrates by heating the liquid stratum into which they are precipitated within a separator vessel, as described in the U.S. patent to Maher, No. 2,873,814, and the use of well fluid for this purpose is suggested in the U.S. patent to Wilson, No. 2,818,454. However, the melting of such hydrates produced by conventional low-temperature separation equipment is still a problem, particularly when the temperature of the well stream is insufficient to cause the hydrates to melt when heat exchangers are used. It is then necessary to add heat, usually by means of a fired vessel. The use of fired vessels at off-shore installations is quite often very expensive since separate platforms often must be provided at 150–200 feet from the production facilities.

It is the object of the invention to provide an improved method and separator for dehydrating well fluid by expansion and temperature reduction wherein the need for a fired heater is obviated despite the fact that the initial temperature of the gas may be so low that it cannot be practicably used by mere heat exchange to melt hydrates produced in the conventional manner.

A further object is to provide an improved method and separator of the character described wherein the pressure of the gas need not be reduced to the extent necessary with conventional techniques if hydrates are to be melted solely by heat exchange with the initial well fluid and/or ambient-temperature fluid such as sea water. More specifically, it is an object to provide an improved method and separator wherein melting is effected at a lower temperature than the melting point of the hydrates at the separation pressure, whereby heat can be added to the system at a relatively low temperature, e.g., ambient temperature.

Still a further object is to provide an improved method and separator of the character described wherein the hydrates are melted in a melting vessel which is separate from and operated at a pressure lower than that prevailing in the separating vessel. Ancillary objects are to provide: means for transferring the hydrate-slush from the separating vessel to the melting vessel while avoiding the danger of freezing or plugging of the transfer line; means for controlling the pressure within the melting vessel to provide for cyclic operation with alternate admission of slush at a relatively higher pressure and melting of hydrates at a relatively lower pressure; and means for flushing hydrates from the separating vessel during transfer of slush to the melting vessel.

Still other objects are to provide a programmer for performing the operations of varying the pressure within the melting vessel, controlling the valve in the transfer line between the separating and pressure vessel, and for controlling the flow of flushing liquid; and to provide a melting vessel which can operate to discharge fluid continuously dispite intermittent admissions of hydrate-bearing slush.

In summary, according to the invention, at least the predominantly gaseous portion of the well fluid is expanded to a separating pressure and admitted into a separating vessel, wherein non-gaseous constituents, including hydrates, are precipitated to form a slush and from which the residual gas is withdrawn; the slush is transferred periodically to a separate melting vessel wherein the hydrates are melted at a reduced pressure, at which the hydrates have a lower melting point. This permits the hydrates to be melted by ambient-temperature heating fluid, such as well fluid and/or sea water.

The control of the transfer of slush from the separating vessel to the melting vessel is preferably by means of a quickly-operating or snap-acting valve to minimize plugging or bridging of obstructions in the transfer line. Further, to minimize the tendency for the slush to freeze upon transfer between vessels, the pressures are substantially equalized, e.g., by raising the pressure in the melting vessel, before the valve is opened. Pressure equalization is preferably accomplished by admitting gas from the separating vessel into the melting vessel periodically.

To flush slush from the separating vessel it is desirable to admit flushing liquid at a temperature above that of the slush during the transfer operation. This is conveniently provided by condensate which is separated from the well fluid in a preliminary separator, prior to expansion thereof to the separating pressure, and accumulated during periods that the transfer line is closed.

The various operations are advantageously controlled by a programmer, such as a pneumatic programmer which includes level-sensing and pressure-sensing elements as described hereinafter.

Figure 2:
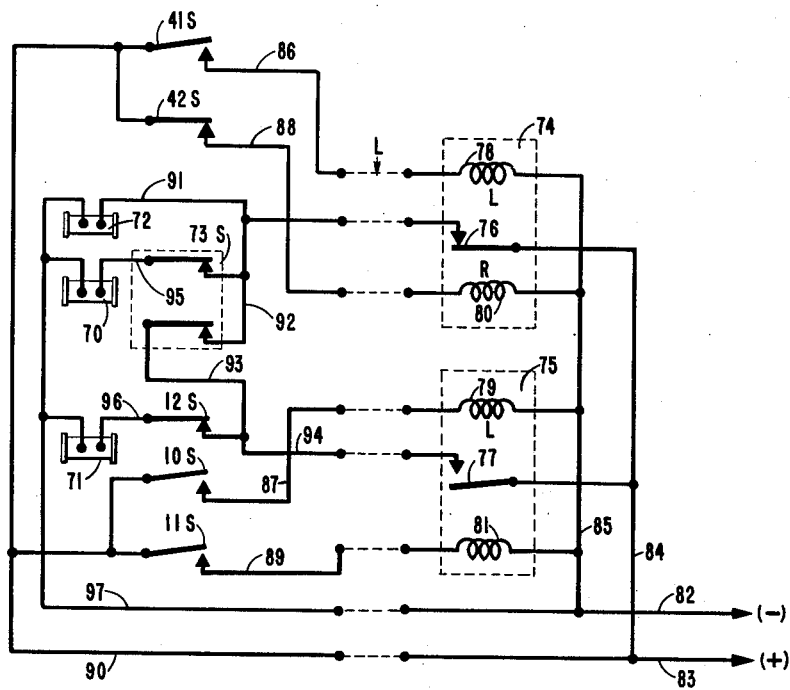

The invention will be further described with reference to the accompanying drawing forming a part of this specification and showing one preferred embodiment by way of illustration, wherein FIGURE 1 is an elevation view of the separator, parts being shown in section; and FIGURE 2 is a circuit diagram showing the pneumatic programmer.

Referring to the drawing in detail, 5 represents a producing well or series of wells flowing by manifold or other suitable connections through a flow line 6. The well stream, which is predominantly gas, may be produced and passed into the flow line 6 at well-head pressure. For example, the well stream may pass into the line 6 at a pressure of several thousand pounds per square inch or pressures as low as 1,000 to 2,000 pounds per square inch, depending upon the operating pressure of the gas transmission line into which the dehydrated gas must ultimately discharge.

When the gas contains considerable amounts of liquid or liquefiable constituents, such as hydrocarbons and/or water, it is preferably fed through open valves 7 and 7a into a preliminary gas-liquid separator 8, which may be of any known or suitable type. When flushing liquid is to be used in the main separating vessel during transfer of slush, it is desirable to include a collecting chamber 9 for accumulating separated liquid. The said chamber may be defined by the shell of the separator 8, as shown, although this arrangement is not essential. In the embodiment shown three liquid-level sensing devices, such as float units 10, 11 and 12 are provided, but this is not restrictive of the invention. The liquid level in the preliminary separator is normally maintained between the levels of the units 10 and 11, which are spaced vertically by only a small difference in height, so as to maintain the chamber 9 full of liquid except when the accumulated liquid is drained to the level of the unit 12 for flushing the main separator, as will be described. The unit 12 is situated at a greater distance below unit 11.

The gas, containing water vapor, is discharged from the preliminary separator via a conduit 13 and is expanded and cooled in any suitable manner. Thus, it can flow through valves 14 and 15 and conduit 16 and pass as heating fluid through a heat-exchange duct 17 and thereafter flow via conduits 18 and 19 and be expanded in an expansion engine, such as a turbine 20. The expanded gas at reduced temperature flows via conduit 21 and is further expanded by discharge into the upper region of an elongated main separating vessel 22 at one end thereof. An expansion device, such as an orifice device or valve 23, is optionally although preferably provided in the conduit 21 immediately adjacent to the vessel to minimize difficulties due to hydrate formation. It will be understood that the vessel 22 may be provided with known or suitable baffles, not shown.

It should be noted that neither the flow of the well fluid through the heat exchange duct 17 nor its expansion in the engine 20 are indispensable features of the invention and either or both may be omitted. Thus, the gas may by-pass both by flow through a by-pass conduit 24 by opening the latter and closing the valve 14. A further by-pass duct 26 and valve 27 may be provided to permit part or all of the gas to by-pass the duct 17.

Operation of the engine 20 is desirably under conditions which do not lead to hydrate formation therein. When necessary, a hydrate-suppressant, such as brine or a glycol, e.g., diethylene glycol or triethylene glycol, is injected via a branch pipe 28 under control of a valve 29. In some instances hydrate formation may be suppressed by control of the pre-cooling in the duct 17, namely, by flowing a greater part of the gas through the by-pass duct 26.

When the preliminary separator is not used, the well fluid is admitted directly to the conduit 13 by a branch conduit 30 and valve 31, by opening the latter and closing the valve 7a.

At the lower temperature prevailing within the separating vessel 22, water vapor is condensed and hydrates may be formed; in most instances, liquefiable hydrocarbons also are condensed. These non-gaseous constituents are precipitated into the lower region of the vessel, wherein they form a stratum of slush 32. The exact physical nature of this stratum will depend upon the nature of the well fluid; it may be a slurry consisting predominantly of liquid with some solid or semi-solid hydrates suspended therein, or may be thick and resistant to flow. The residual gas is discharged at the end of the vessel remote from the gas inlet via a gas outlet duct 33 essentially at the separating pressure within the vessel. This pressure is considerably above atmospheric, e.g., 200 to 1000 pounds per square inch, to avoid the necessity of recompression. The bottom of the vessel has an outlet opening 34 for the slush, which communicates to a slush transfer pipe 35 provided with a valve 36. One or more liquid inlet pipes 37, 38 are connected to discharge into the bottom of the vessel 22 and receive liquid from the chamber 9 via a flow-control valve 39 and pipe 40. The vessel is provided with level-sensing means, such as a pair of float units 41 and 42.

The transfer pipe 35 discharges into a closed, elongated melting vessel 43, preferably near one end thereof. This vessel may contain, near the opposite end, known or suitable skimming means for separating oil and water, such as an upwardly open skimming chamber 44 the edge of which forms an overflow weir. It is connected to an oil discharge pipe 45 having a valve 46. The skimming chamber contains a level-sensing device such as a liquid-level controller 47 including a float which controls the valve 46 by a valve operator 48 to maintain the desired oil level in the skimming chamber. The vessel further has a water discharge pipe 49, provided with a valve 50. An interface-level controller 51, also including a float, controls the action of the latter valve by a valve operator 52 to maintain the desired level of the interface between the water phase or stratum 53 and the supernatant stratum 54 which contains hydrates. A hydrocarbon stratum 55 forms above the hydrates and the uppermost part 56 of the vessel contains gas. The vessel preferably contains vertical baffles 57, 58 and 59 near the skimmer to hold the hydrate stratum 55 away from the region near the skimmer. The heat exchange duct 17 is positioned in relation to the controlled interface level to be immersed in the hydrate stratum. A gas outlet pipe 60 communicates with the vessel and is connected via a three-way valve 61 to a low-pressure outlet pipe 62. When the pressure in the latter pipe is not otherwise controlled, it is desirable to provide a pressure-regulating valve 63 by which the melting vessel is maintained at a desired pressure below that of the main separating vessel, e.g., at 50 to 300 pounds per square inch. It is, of course, possible to operate the melting vessel at atmospheric pressure, making the pressure-regulating valve unnecessary.

The valve 61 is connected by a pipe 64 to the high-pressure gas discharge pipe 33, the construction of the valve being such that the melting vessel can be connected selectively to the pipes 62 or 64, but communication between these two pipes is prevented. The valve is shown in its normal position.

The melting vessel contains suitable means for imparting heat to the slush to melt the hydrates. This may include ducts for passing a fluid in indirect heat exchange with the slush, such as the previously mentioned duct 17 or a duct 65 through which other heating fluid can be circulated. For example, in an off-shore production facility the heating fluid is sea water, which is drawn from the ocean via a pipe 66 by a pump 67 and discharged into the ocean through a pipe 68. The pump 67 is coupled to the turbine 20 to be driven thereby. When the work delivered by the turbine is insufficient, the pump is driven by a separate engine, such as a steam turbine 69.

The heat exchange ducts 17 and 65 may have any configuration and are preferably mounted to be immersed for the greater part in the slush layer 54. The thickness and height of this layer may vary, so that complete immersion may be not always feasible.

The valve 36 in the transfer pipe is preferably the quick-acting or snap-acting and is of the full-open type, so as to avoid as far as possible any restriction or flow obstruction even while the valve is being opened or closed. Such a restriction can lead to bridging and plugging of the passage by slush. Thus, a plug, slide or gate valve is used in preference to a globe valve.

There is also a tendency for the slush to freeze in the transfer pipe if permitted to flow from the high pressure prevailing in the separating vessel 22 to the lower pressure in the melting vessel 43. For this reason it is desirable to effect substantial equalization of the pressures in the two vessels before opening the valve 36. The slush then flows by gravity or with only a small pressure difference. This equalization is effected automatically by a pneumatic programmer to be described. While an electrical circuit and solenoid-actuated valves will be described, it will be understood that these are merely exemplary of the invention and that equivalent pneumatic or mechanical elements may be substituted.

Each of the valves 36, 39 and 61 is provided with a solenoid actuator, indicated diagrammatically at 70, 71 and 72. The pipe 60 is provided with a pressure-sensing device 73 which closes a two-pole electrical switch 73S (FIGURE 2) when the pressure in the melting vessel rises above a predetermined level and opens the switch below the same at approximately the same predetermined level. Further, the level-sensing devices 10, 11, 12, 41 and 42 are connected mechanically to operate electrical switches 10S, 11S, 12S, 41S and 42S, which are operated in accordance with levels sensed thereby. Specifically, the devices 10 and 41 close their associated switches upon a rise in the respective liquid level and open them when the level falls below a set point. The devices 11, 12 and 42 operate in reverse to close their switches upon a fall in liquid level and open them when the level rises. For clarity the circuits interconnecting these switches are omitted from FIGURE 1.

Referring to FIGURE 2, programmer includes the above-mentioned switches and solenoid valves, a pair of latching relays 74 and 75, outlined in dashed lines, and interconnecting circuits. Each relay includes a single-pole switch 76 or 77, a latching coil 78 or 79 and a release coil 80 or 81. As is well known in the electrical art, when the latching coil is energized the relay switch contacts are closed and remain latched even after the latching coil is de-energized; they are opened when the release coil is energized and remain open until the latching coil is again energized. The system is energized by a source of electrical A.C. or D.C. potential, not shown, transmitted through a power circuit 82, 83. One side of each of the switches 76 and 77 is connected by a circuit 84 to the power circuit 83 and one terminal of each relay coil is connected by a circuit 85 to the power circuit 82. The other (line) terminals of the relay switches and coils, as well as the power circuits, are connected to the several circuit elements at the separator by transmission lines collectively designated at L. The other terminals of the latching coils 78 and 79 are connected by circuits 86 and 87, respectively, to the switches 41S and 10S and the release coils 80 and 81 are similarly connected by circuits 88 and 89 to the switches 42S and 11S, respectively. The other terminals of these four level-controlled switches are connected by a circuit 90 to the power circuit 83. The line side of the relay switch 76 is connected via a circuit 91 to one terminal of the switch solenoid 72; it is further connected by a branch circuit 92 in parallel to the two poles of the switch 73S. One armature of the latter switch is connected by a circuit 93 to one side of the switch 12S, which is further connected by a circuit 94 to the line side of the relay switch 77. The other armature of the switch 73S is connected by a circuit 95 to one terminal of the solenoid 70 and the armature of the switch 12S is connected by a circuit 96 to one terminal of the solenoid 71. The other terminals of the solenoids 70, 71 and 72 are connected by a circuit 97 to the power circuit 82.

The solenoids 70 and 71 open the valves 36 and 39, respectively, when energized, the valves being provided with suitable means, such as springs (not shown), for closing the valves when the solenoids are de-energized. Similarly the solenoid 72 moves the valve 61 to establish communication between the pipes 60 and 64 when energized and the valve is provided with suitable means for returning it to the position shown when the solenoid is de-energized. FIGURE 2 illustrates the positions of the relays and switches during a slush-transfer operation, with the liquid level in the chamber 9 between the levels of the units 11 and 12 and the level of the slush in the vessel 22 between the levels of the units 41 and 42.

Operation of the programmer is as follows:

A. *Normal Phase*

In the normal condition, the vessel 22 is at a relatively higher pressure than the melting vessel 43, the valve 36 is closed, and the valve 61 is in the position shown. The relay switches 77 and 76 are open while the level in the chamber 9 is below the float of the device 10. As liquid is separated from the gas in the preliminary separator, the level in the chamber 9 rises to accumulate a body of flushing liquid. When the level rises to that of the device 11 switch 11S is opened; this causes de-energization of the release coil 81 without operating the relay. When the level rises sufficiently to close the switch 10S and relay 75 is operated by its coil 79, thereby energizing the solenoid 71 and opening the valve 39 to admit condensate via pipes 37 and 38. The relay remains latched until the level falls to that of the device 11, whereupon the relay is released by closing of the switch 11S and energization of the coil 81 to close the valve 39. The accumulated liquid below the device 11 is thereby not depleted during this phase of the operation. During the foregoing operation the pressure in the melting vessel is sufficiently low to prevent closing of the switch 73S. Closing of the relay switch 77 is, therefore, ineffective to energize the solenoid 70 because the circuit 93 is interrupted.

B. *Change to Transfer*

When the stratum 32 of slush rises sufficiently to cause the switch 41S to close the relay 74 is operated by its coil 78, thereby applying power via the circuit 91 to the solenoid 72 and operating the valve 61 to transfer position to admit high-pressure gas from the vessel 22 via the pipes 64 and 60 to the melting vessel. When the pressure in the latter has risen sufficiently to achieve substantial pressure equalization, the switch 73S closes and the solenoid 70 is energized via circuit 95. This opens the valve 36 and causes slush to flow by gravity or under a small pressure difference through the transfer pipe 35.

C. *Return to Normal*

When the slush level in the operating vessel falls sufficiently to cause the switch 42S to close, the relay 74 is released, thereby de-energizing the solenoids 70 and 72. The quick-acting valve 36 closes immediately and the valve 61 returns to the position shown, which permits gas to flow from the melting vessel through the low-pressure pipe 62, thereby re-establishing the low pressure in this vessel. If the switch 77 were closed during this operation, the valve 36 would not close until the pressure had fallen sufficiently to open the switch 73S; however, this is not possible because the liquid level at this time is well below the level of the device 11, so that switch 10S is open and switch 11S is closed. The solenoids 70 and 72 remain de-energized until the switch 41S is again closed.

When used, the valve 39 is opened by its solenoid 71 during operation B, above, to admit liquid into the separating vessel. This liquid, being warmer than the slush, flushes the slush. The solenoid 71 is energized through switch 12S only until the liquid level in the separator falls to the level of the device 12, whereupon this switch opens and the valve 39 is closed. It is desirable to make the chamber 9 large enough so that the liquid therein will not be depleted during the transfer operation; in other words, the switch 12S then never opens and is provided mainly as a safety device.

It is evident that the programmer can be modified in various respects without departing from the scope of the invention as defined in the claims. Thus, the relay contacts have two conditions, viz., open and closed, and the valve solenoids can be connected to open a valve for either of these conditions by a simple reversal of the operating linkages. Similarly, the operations of the switches 10S, 11S, 12S, 41S and 42S can be made opposite to those described.

The advantage of melting the slush in a separate vessel at a lower pressure stems from the fact that the melting point of hydrates rises with pressure. When recompression of the effluent gas is to be avoided, it is not feasible to reduce the pressure sufficiently to lower the melting point to the level at which ambient-temperature fluid such as sea water can be used to melt the slush. For example, if the pressure in the separating vessel were dropped to as low as 300 pounds per square inch, the hydrate melting point would be about 46° F., and sea water at 45° F. would raise the hydrate temperature insufficiently to permit melting in any practicable operation. (In practice, pressures considerably above 300 pounds per square inch are often desirable in the separating vessel.) However, by reducing the pressure in the melting vessel to 100 pounds per square inch or less the hydrate-melting temperature can be reduced to 32° F. or lower, which is sufficiently below minimum sea water temperature to permit year-round operations.

We claim as our invention:

1. The method of dehydrating a high-pressure, gas-containing well stream which comprises the steps of: expanding at least the predominantly gaseous portion of said well stream to a superatmospheric separating pressure below that of the well stream and introducing the said portion into a confined separating zone at a temperature below that at which hydrates are formed at the said separating pressure; precipitating non-gaseous constituents including hydrates from said admitted portion within said zone and thereby forming therein a stratum of slush; withdrawing residual gas substantially at said separating pressure from said zone; transferring said slush from said separating zone to a confined melting zone; melting the hydrates in said slush within said melting zone at a pressure lower than said separating pressure; and discharging liquid from said melting zone.

2. Method defined in claim 1 wherein the step of melting said slush within said melting zone includes flowing at least a part of said well fluid, prior to expansion thereof, in indirect heat exchange with the slush.

3. Method defined in claim 1 wherein the step of melting said slush within said melting zone includes flowing sea water at ambient temperature in indirect heat exchange with the slush.

4. In combination with the steps defined in claim 1, the steps of initially introducing the said well stream, prior to said expansion thereof, into a preliminary separating zone and therein separating the stream into gaseous and liquid phases; supplying the gas from said preliminary separating zone to the said expansion step; and feeding the liquid from the said preliminary separating zone directly to the first-mentioned separating zone at the level of said stratum of slush and at a temperature above that of the slush.

5. Method defined in claim 1 where the slush is transferred intermittently, said method including the additional steps of initially introducing the said well stream, prior to said expansion thereof, into a preliminary separating zone and therein separating the stream into gaseous and liquid phases; supplying the gas from said preliminary separating zone to the said expansion step; accumulating a body of liquid from said preliminary separation zone up to a predetermined amount; and feeding the liquid from the said preliminary separating zone directly to the first-mentioned separating zone by flowing liquid from said body at a temperature above that of the slush in the separating zone concurrently with the transfer of slush to the melting zone to flush out hydrates in the separating zone and, at other times, flowing only such liquid as may be separated from gas in the preliminary separating zone in excess of that required to accumulate said body of liquid.

6. In combination with the steps defined in claim 1, the cyclic steps of increasing the pressure within said melting zone substantially to the said separating pressure; transferring slush from the separating zone to the melting zone only when the pressure in the latter zone in substantially the same as that in the separating zone; and decreasing the pressure in the melting zone to effect melting of the hydrates at a temperature lower than the hydrate melting temperature for said separating pressure.

7. The method defined in claim 6 wherein the pressure in the melting zone is increased by admitting gas from the separating zone into the melting zone.

8. In combination with the steps defined in claim 6, the steps of separating liquid from said well stream prior to expansion of said gaseous portion thereof; accumulating the separated liquid at a temperature above that of the slush within the separating zone during periods that no transfer of slush between said zones occurs; and admitting said accumulated liquid into the lower part of the separating zone at a temperature above that of the slush therein and thereby slushing hydrates from said zone.

9. Method as defined in claim 1 wherein said gaseous portion of the well stream is expanded with the production of shaft work, in combination with the steps of using said shaft work to pump a heating fluid and flowing said heating fluid in indirect heat exchange with the slush within said melting vessel.

10. A well-fluid separator for separating an aqueous portion from the gaseous portion of a high-pressure well fluid which comprises: a closed separator vessel adapted to contain said stream under pressure; means for expanding and admitting at least the predominantly gaseous portion of said well stream into said separator vessel; a gas outlet for said separator vessel; a separate, closed melting vessel; transfer means for transferring slush from the lower part of the separator vessel to the melting vessel, said transfer means including valve means for maintaining the melting vessel at a pressure which is lower than that in the separating vessel; means for supplying heat to melt the slush within the melting vessel; and liquid discharge means for the melting vessel.

11. In combination with the separator defined in claim 10, a preliminary gas-liquid separator having an inlet for receiving said well fluid, a chamber for collecting separated liquid, and a gas outlet; duct means for flowing gas from said gas outlet to the said means for expanding and admitting the gaseous portion into the separator vessel; separate duct means for flowing liquid from said chamber to the separating vessel; and flow-control means for alternately filling said chamber to a predetermined level and discharging liquid therefrom to the separator vessel for flushing slush from the latter.

12. In combination with the separator defined in claim 10, duct means within said melting vessel for flowing a heating fluid in indirect heat exchange with slush within said melting vessel.

13. The combination defined in claim 12 wherein said duct means is connected to the said means for expanding and admitting the gaseous portion into the separator vessel, whereby said gaseous portion can be flowed as the said heating fluid prior to expansion.

14. The combination defined in claim 12 wherein said duct means is connected to a source of ambient-temperature liquid for flow as the said heating fluid.

15. The combination defined in claim 12 wherein the said means for expanding the gaseous portion includes an expansion engine, the combination including, further, pump means coupled mechanically to said engine and connected to said duct means for flowing the heating fluid therethrough.

16. In combination with the separator defined in claim 10, means for alternately (a) substantially equalizing the pressures within the separating and melting vessels and (b) establishing a pressure difference such that the melting vessel is at a relatively lower pressure, said valve means being operable to effect transfer of slush when said pressures are substantially equalized and prevent transfer of slush at the pressure relationship stated in (b).

17. In combination with the separator defined in claim 10, means for alternately (a) raising the pressures within the melting vessel to a level substantially equal to that within the separating vessel and (b) reducing the pressure within the melting vessel to a level below that within the separating vessel; and control means for said valve means for opening the said valve means when the melting vessel pressure is raised and closing the valve means when the melting vessel pressure is reduced.

18. The combination defined in claim 17 including, further, level-sensing means for sensing the level of slush within the separator vessel, and control means responsive to and connected to said level-sensing means for controlling the means for alternately raising and reducing the pressure within the melting vessel.

19. The combination defined in claim 17 including, further, pressure-responsive means for sensing the pressure prevailing within the melting vessel, the said control means for the valve means being responsive to said pressure-responsive means.

20. The combination defined in claim 17 wherein the means for alternately raising and reducing the pressure within the melting vessel includes a pressure gas duct interconnecting the said vessels for admitting gas from the separating vessel to the melting vessel to increase the pressure therein, a shut-off valve in said gas duct, and means for venting gas from the melting vessel.

21. In combination with the separator defined in claim 10, level-sensing means for sensing the level of slush in said separating vessel; pressure-control means responsive to said level-sensing means for increasing the pressure in the melting vessel when the slush level rises and for reducing the said pressure when said slush level falls; and valve-control means for opening the valve means in the transfer means to effect transfer of slush when the said pressure is increased and for closing the said valve means when the said pressure is reduced.

22. The combination defined in claim 21 including, further, a preliminary gas-liquid separator having an inlet for receiving said well fluid, a chamber for collecting separated liquid, and a gas outlet connected to said means for expanding and admitting the gaseous portion into the separator vessel; separate duct means for flowing liquid from said chamber to the separating vessel; and flow-control means for said duct means flowing liquid to the separating vessel to flush slush therefrom when said valve means is open and for accumulating liquid in said chamber when said valve means is closed.

23. A programmer for controlling the cyclic operation of a well-fluid separator which comprises a separating vessel and a melting vessel interconnected by a transfer pipe, a low-pressure outlet for the melting vessel, a first valve arranged to connect the melting vessel selectively to said low-pressure outlet or to said separating vessel, and a second valve for said transfer pipe, said programmer comprising: an electrical relay having contacts movable between open and closed positions; level-sensing means in said separating vessel for sensing the level of slush therein; electrical circuit means for operating said relay to move said contact to a first position upon a rise in said slush level to a predetermined upper level and maintaining said contact in said position until the level falls to a predetermined lower level and thereafter maintaining said contacts in their second position until return of said level to the upper level; first valve-operating means responsive to the position of said contacts for actuating said first valve to transfer position interconnecting the melting vessel to the first vessel when said contacts are in their first position and for returning the valve to normal position interconnecting the melting vessel to said low-pressure outlet when the contacts are in their second position; second valve-operating means responsive to the position of said contacts for opening said second valve to establish flow between said vessels when said contacts are in their first position and for returning the valve to closed position when the contacts are in their second position; pressure-sensing means for measuring the pressure in said melting vessel; and means responsive to the said pressure-sensing means for modifying the action of said second valve-operating means to maintain the second valve in closed position whenever the pressure in the melting vessel is below a predetermined value.

References Cited in the file of this patent
UNITED STATES PATENTS

| | | |
|---|---|---|
| 2,243,188 | Biach | May 27, 1941 |
| 2,363,529 | Hutchinson | Nov. 28, 1944 |
| 2,399,723 | Crowther | May 7, 1946 |
| 2,410,583 | Hutchinson | Nov. 5, 1946 |
| 2,528,028 | Barry | Oct. 31, 1950 |
| 2,739,608 | Brower | Mar. 27, 1956 |
| 2,747,002 | Walker | May 22, 1956 |
| 2,818,454 | Wilson | Dec. 31, 1957 |
| 2,873,814 | Maher | Feb. 17, 1959 |
| 2,904,511 | Donath | Sept. 15, 1959 |
| 2,943,124 | Wilson | June 28, 1960 |
| 3,003,007 | Newsome | Oct. 3, 1961 |